(No Model.)

W. H. STEWART.
BRICK MACHINE.

No. 302,872. Patented July 29, 1884.

Attest:
H. Walter Fowler
H. B. Applewhaite

Inventor:
Wm. H. Stewart
per attys
A. H. Evans & Co.

(No Model.) 5 Sheets—Sheet 4.
W. H. STEWART.
BRICK MACHINE.
No. 302,872. Patented July 29, 1884.
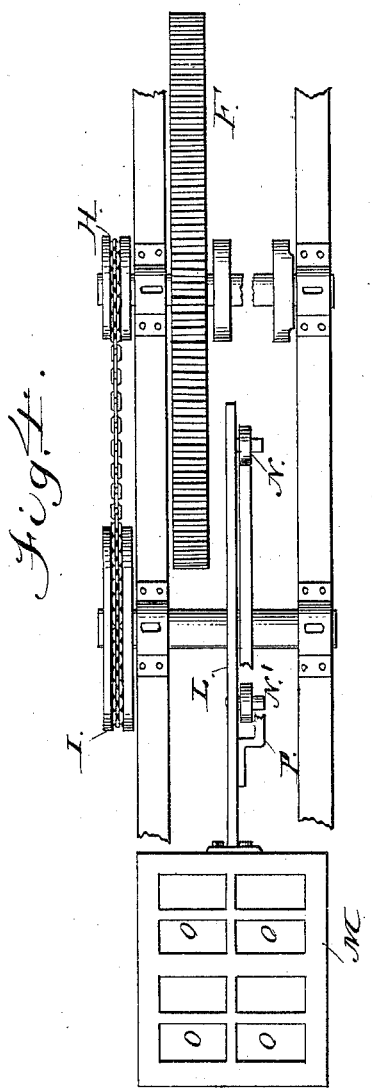
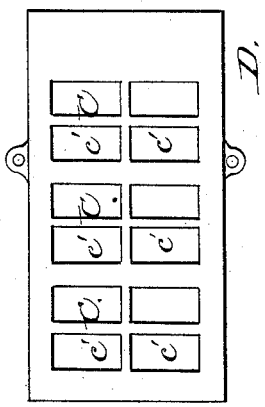
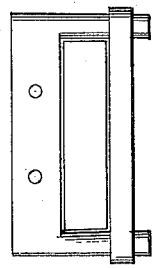
Attest;
Walter Fowler
H. B. Applewhaite
Inventor;
Wm H. Stewart
per attys.
A. H. Evans & Co.

(No Model.) 5 Sheets—Sheet 5.

W. H. STEWART.
BRICK MACHINE.

No. 302,872. Patented July 29, 1884.

Attest;
S. Walter Fowler,
H. B. Applewhaite,

Inventor;
Wm. H. Stewart
per attys.
A. H. Evans & Co.

UNITED STATES PATENT OFFICE.

WILLIAM H. STEWART, OF BOONVILLE, MISSOURI.

BRICK-MACHINE.

SPECIFICATION forming part of Letters Patent No. 302,872, dated July 29, 1884.

Application filed November 20, 1883. (No model.)

*To all whom it may concern:*

Be it known that I, WILLIAM H. STEWART, residing at Boonville, in the county of Cooper and State of Missouri, have invented a new and useful Brick-Making Machine, of which the following is a specification.

My invention relates to improvements in brick-making machines; and it consists in the novel arrangement and combination of parts, as hereinafter described, and specifically set forth in the claims. I attain these objects by the mechanism illustrated in the accompanying drawings, in which—

Figure 1:
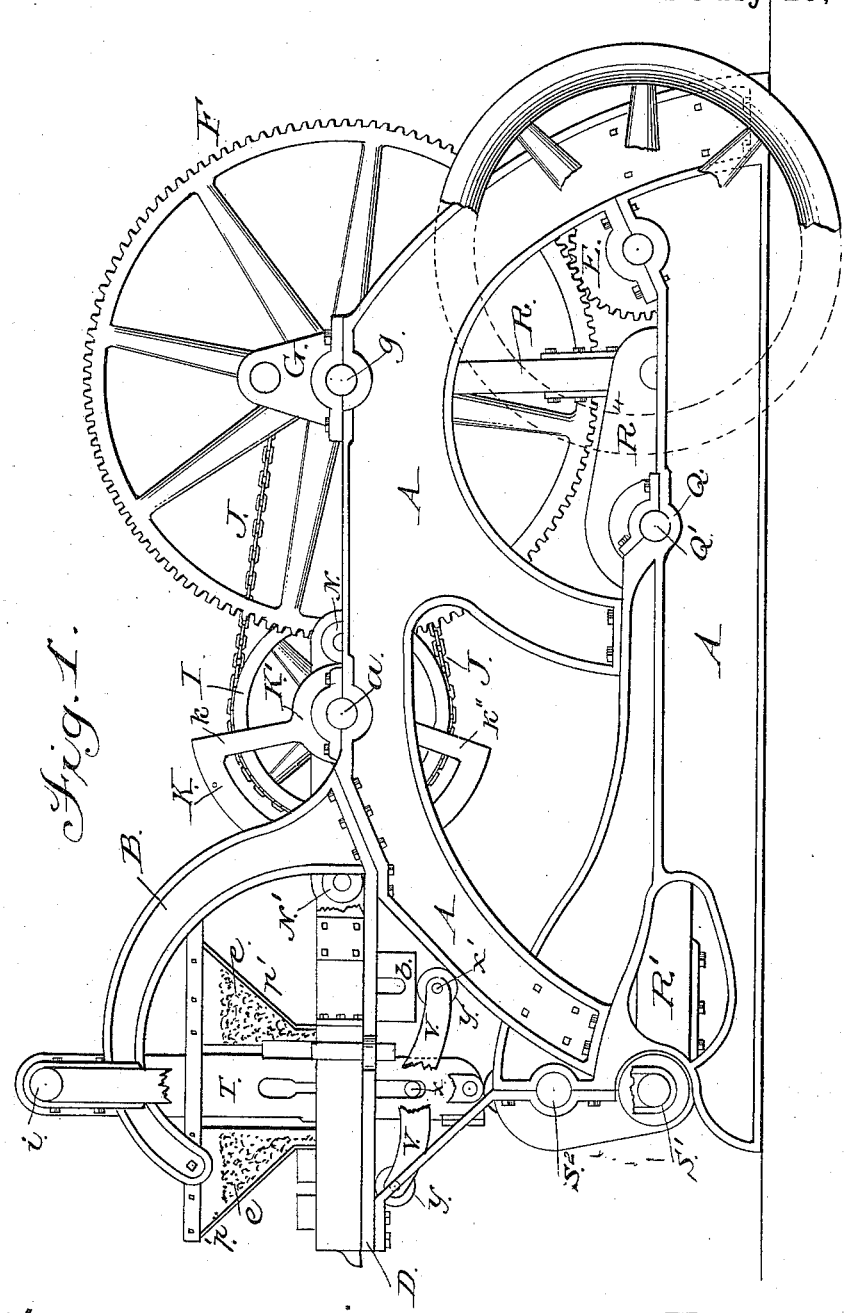
Figure 2:
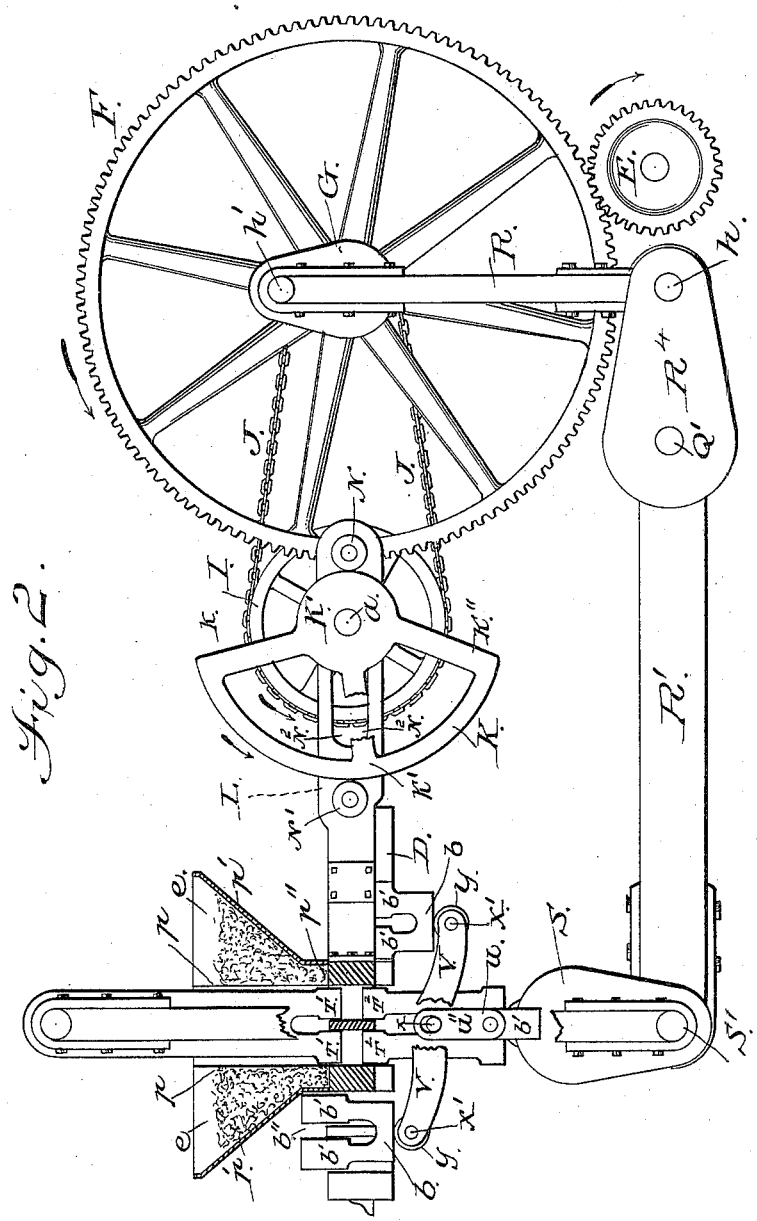
Figure 3:
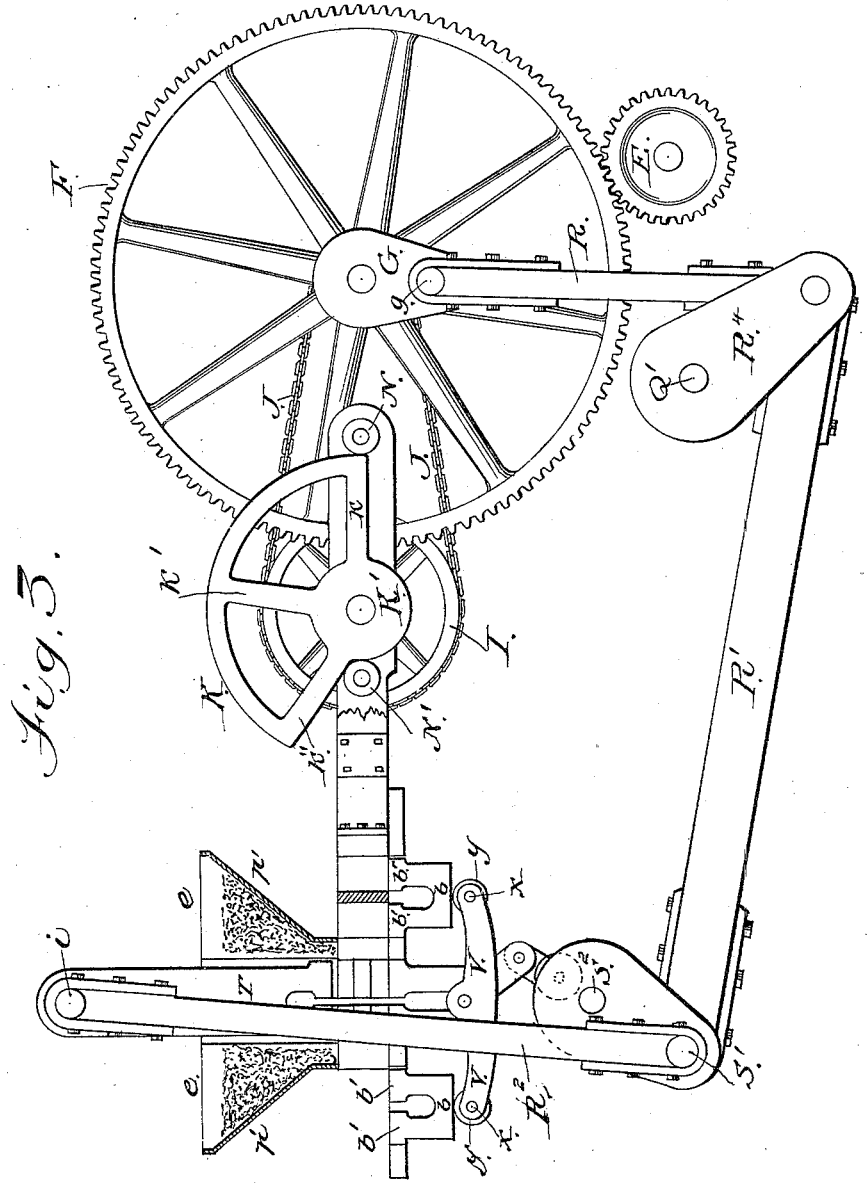
Figure 6:
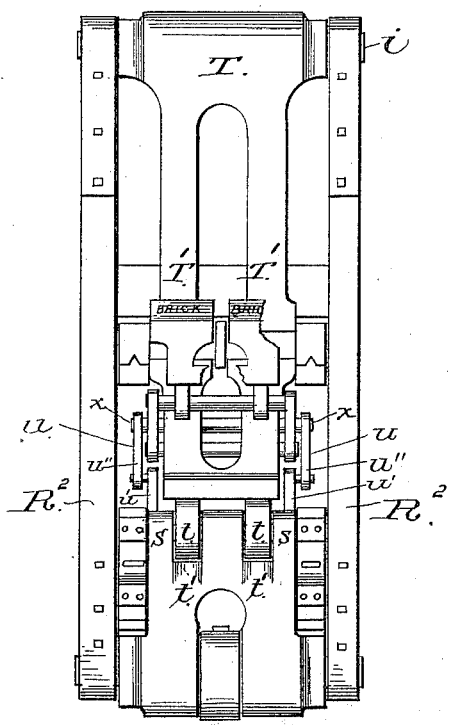
Figure 5:
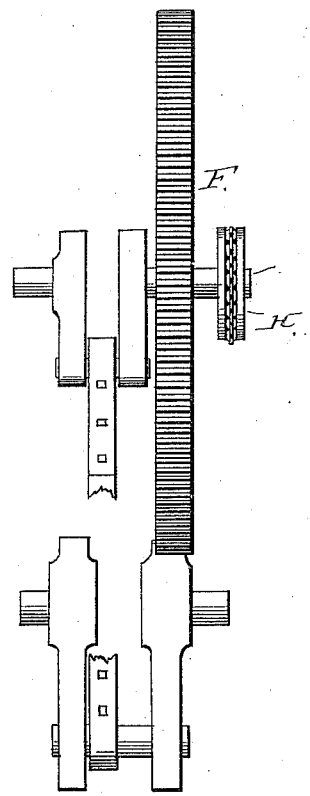
Figure 9:
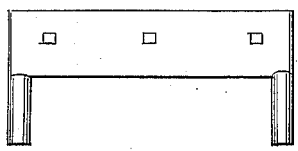

Figure 1 is a longitudinal elevation of my improved machine. Fig. 2 is a view partly in section with the frame removed and the plungers brought together in their closed position. Fig. 3 is the same showing the plungers drawn apart. Fig. 4 is a plan view of the toothed wheel L, gear-wheel N, and brick-mold C. Fig. 5 is a vertical end view of the wheel L, pulley R, and crank J. Fig. 6 is a vertical front view showing the plungers and mechanism for operating the same. Fig. 7 is a plan view of the bed or table, and Figs. 8 and 9 are views in detail.

Similar letters refer to similar parts throughout the several views.

In the drawings, A represents a frame constructed of any suitable material and shape, but preferably in the manner and form here shown.

On the frame A is journaled a shaft or axle, $g$, having an eccentric or cam, G, and on said shaft and secured to the outside of the frame A is a grooved pulley, H, the object of which will be hereinafter more fully described. A toothed wheel, F, of large diameter, is secured to the shaft $g$, and is adapted to intermesh with a toothed wheel, E, suitably journaled, and which is connected to mechanism by which power is derived to operate the device. A shaft, $a$, is journaled on the frame A and in front of the wheel F, which carries, preferably, a grooved wheel or pulley, I, (a toothed wheel may be substituted, if desired,) around which passes an endless belt or chain, J, which also encircles the pulley H on the shaft $g$, by which means motion is imparted to a segment or cam wheel, K, also secured on the shaft $a$. The periphery of the segment K is connected to the hub or center piece, K', by the spokes $k$ $k'$ $k''$, as many of which may be employed as found desirable. The spoke $k''$ being cam-shaped at its end and formed in an inclined position in relation to the center of the shaft $a$, and slanting to any number of degrees—*i. e.*, so that when the segment K is revolved in the direction of the arrow and the spoke $k''$ forced against and at an inclination upon the roller N', to be hereinafter described, it will force or push said roller forward, and also the bar or rod to which it is securely pivoted, and as the segment continues to revolve will, when it reaches the roller N, similarly pivoted to the bar, have the same effect upon said roller, and thus draw the roller N' back to its normal position.

On the front portion of the frame A is suitably secured a bed or table, D, upon which is a mold-frame, M, made preferably in the form shown, and provided with eight rectangular compartments, O, made in shape and form to correspond with that of an ordinary brick, the said frame being adapted to have a sliding motion both backward and forward. From one of the sides of the mold-frame extends a longitudinal rod or bar, L, having formed near its end a longitudinal slot, $N^2$, through which the shaft or axle $a$ is adapted to pass, and which thus supports that portion of the rod L.

On the side of the rod L is secured a projecting bar, P, extending outward a sufficient distance, so as to allow the segment K to revolve freely between it and the bar, and in which space are pivoted, one near each end, the rollers N N', the purpose of which is to impart to the mold-frame M a reciprocating motion on the bed D, by means of the arm $k''$ of the segment K coming in contact with the rollers N and N', as before described.

On the forward part of the frame A and in rear of the bed D are secured arms B, which extend upwardly and downwardly, and curved, as shown in Fig. 1, for the purpose of supporting hoppers $e e$, to which they are suitably secured, one being placed on each side of the plunger-arms T'. In the drawings I have shown the hoppers $e e$ formed of an inner upright portion, $p$, and an outer inclined portion, $p'$, terminating in mouths or openings $p''$, adapted, when the mold-frame is reciprocated in one direction or the other, to register, respectively, with the compartments or molds O, and the purpose of which is to feed the molds at proper intervals of time, so that as one set of molds are being filled ready for the plungers or compressors the other set of molds will be getting into position to be relieved of their contents.

As I do not wish to claim in this application any precise means of alternately closing and opening the mouths of the hoppers $e$ $e$, I have described no means of effecting the same, as any method now in use may be employed.

On the upper lower portion of the frame A an eccentric or cam, $R^4$, is journaled in bearings Q by a shaft or axle, $Q'$, and is connected to the eccentric G, before mentioned, by an upright rod, R, pivoted as shown at $h$ $h'$. The eccentric $R^4$ is also connected by a horizontal rod, $R'$, by a pin, $S'$, to a cam or eccentric, S, which is journaled in bearings $S^2$ on the frame A. The shaft or axle $S'$, on which the eccentric S and connecting-rod $R'$ are loosely secured, has pivoted or secured on each of its outer ends the upright arms or rods $R^2$ $R^2$, which are at their upper portions secured by means of an axle, $i$, to a downwardly-extending plunger or compressor, T, having or terminating in four arms, $T'$ $T'$, two of which are only shown, the lower portions of which are so formed as to adapt themselves to the form of the mold O of the frame M. The eccentric S is provided at its upper or wide portion with short arms or lugs $s$ $s$ $s$, forming slots $t'$ $t'$, in which are secured the friction-rollers $t$ $t$, which are adapted to raise the upwardly-extending arms or plungers $T^2$ $T^2$, which are in form the counterpart of the depending arms or plungers $T'$ $T'$, before described, and the object of which is to force both the upper and lower arms or plungers toward and from each other when the machine is in operation.

On each side of the outer lugs $s$ $s$ are secured toggle-joints $u$, consisting of the parts $u'$ $u''$, which are pivoted or journaled to an axle or rod, $x$, passing between the four upwardly-extending arms $T^2$ $T^2$, and to which axle is pivoted, between the toggle-joints $u$ and arms $T^2$, horizontally-curved levers V V, carrying at their ends rollers $y$ $y$, secured thereto by means of rods $x'$ $x'$, the purpose of which will be hereinafter more fully described.

The bed or table D is preferably constructed in the form shown in Fig. 7, in which there are constructed three separate compartments, C C C, each containing four rectangular molds, $c'$ $c'$ $c'$ $c'$, made to conform in size to the plunger-arms $T'$ and $T^2$, which are adapted at the proper time to be forced into and withdrawn from the mold.

Resting upon the pivoted rollers $y$ $y$ of the horizontal levers V V are the upwardly and downwardly sliding lifters $b$ $b$, provided with the upwardly-extending arms $b'$ $b'$, four of which are formed on each lifter, which are adapted to pass through or on a level with the mold O of the frame M and the compartment C of the frame or bed D. Between the four plungers or arms $b'$ $b'$ are the downwardly-extending longitudinal and lateral slots or spaces $b''$ $b''$, for the purpose of allowing the arms to freely pass through and between the dividing-lines of the molds C and O.

I will now proceed to describe the operation of my device.

To refer to Fig. 3 of the drawings, in which the compressors or plungers are shown as separated or drawn apart, one set of which are resting over and the other under the mold-frame M and bed D, to now compress or form the bricks, the several parts being in the position shown, motion will be imparted by the driving-gear E to the toothed wheel F, which, as it revolves in the direction of the arrow, will also revolve the grooved pulley H and pulley I by means of the belt J, which in turn forces the cam or segment wheel K to press by its inclined portion $K''$ against the pivoted roller $N'$ on the rod L, thus forcing the same forward, and at the same time placing the forward part of the mold-frame M—that is, the four molds O O O O—under and in line with the plungers $T'$ and $T^2$, which will have received, respectively, an upward and downward movement by means of the rods and eccentrics connected to the main driving-wheel F. As the roller $h'$ is pushed or forced forward by the cam K, it will, when it reaches the periphery, revolve around the same, during which time the mold-frame M will remain in a stationary position, and thus allow time for bricks to be compressed. At the same time that the periphery is revolving over the roller $N'$ the roller N will be in contact with the outer circumference of the hub $K'$, which, when the portion $K''$ is reached, will force the roller N and rod L backward, by which means a reciprocating motion will be given to the mold-frame, the time allowed during each forward and backward movement being sufficient to allow the plungers or arms to be drawn toward and apart from each other, and thus also allow time for the bricks to be compressed and the molds to be alternately filled and emptied of their load. As will be seen, the motion transmitted to the eccentrics $R^4$ and S is a backward and forward one. It will also be seen that as the eccentric S is brought down to a perpendicular position it will cause the horizontal levers to be forced upward, and, as the mold-frame is over the rear lifters $b$ $b$, (see Fig. 2,) it will prevent them from being raised on that side, and in consequence of which the outer lifters $b$ $b$ will be forced through the bed D and one end of the mold-frame M, which by the same operation will lift or raise the bricks from the molds to a sufficient height to be removed. It will be clearly seen that a continual motion will have the reverse effect upon the parts—that is, allow the bricks in the rear mold to be removed as the compressors are forming brick in the forward mold, and so the machine will continue to operate, filling and compressing one set of molds while the other set is being relieved of their load.

Having thus fully described my invention, what I desire to claim and secure by Letters Patent is—

1. In a brick-machine provided with a stationary bed or table, the combination of the wheel F, eccentrics G, R$^4$, and S, connected by rods R R', the rods R$^2$ being connected to the plungers T, having depending arms T' T', the eccentric S, and upwardly-extending plungers T$^2$ T$^2$, the said plungers being adapted to be drawn toward or from each other, substantially as shown and described.

2. In combination with a brick-machine, the toothed wheel F, grooved pulleys H I, connected by an endless belt, the segment K, having beveled inclined portions, the slotted rod L, and mold-frame M, whereby the same is given a backward and forward motion upon a stationary bed or table, and means whereby the molds are alternately filled and emptied, substantially as shown, and for the purpose described.

3. In combination with a brick-machine, the stationary table or bed D, sliding frame M, having the compartments O, and connected by a rod to a segment, K, by which means a reciprocating motion is obtained, the alternately-lifting plates $b'$ $b'$, operated by means of rocking levers V, having rollers $y$, connected by a lever and toggle-joints to the eccentric S, from which it derives motion, all substantially as shown and described.

4. In a brick-making machine, the toothed wheel and pulleys, the cam or segment connected to a slotted bar provided with a mold-frame at one end, adapted to slide upon a stationary bed-plate, in combination with eccentrics and connecting-rods, the plunger-arms T' and T$^2$, and horizontal levers V V, adapted to raise and lower the portions $b$ $b'$, the whole being operated substantially as shown and described.

5. In a brick-making machine consisting of the frame on which is supported the operating mechanism consisting of the toothed wheel F, grooved pulleys H I, connected by an endless belt, the segment K, and slotted bar or rod L, having the rollers N' N, and mold-frame M, adapted to receive a backward and forward motion upon a stationary bed or table, D, frame B, and hoppers $e$ $e$, the plungers or compressors T' T', having the broadened depending and upwardly-extending arms connected by means of rods and eccentrics to the main driving-wheel, the horizontal levers V, connected by toggle-joints to the eccentric, whereby the same is raised or lowered, in combination with sliding lifters $b'$ $b$, substantially as described, and for the purpose set forth.

6. In combination with a brick-making machine provided with a stationary bed or table, the eccentrics and rods suitably connected to the plungers or compressors, the eccentric S, having friction-wheels $t$ $t$, whereby the plungers T T$^2$ are raised or lowered, the horizontal levers V having rollers $y$, adapted to alternately lift and lower the sliding plates $b'$ $b$, and thus raise the molded bricks from the mold-frames, substantially as shown and described.

7. In a brick-machine, the combination of the toothed wheel F, grooved pulleys H I, belt J, the shaft carrying the segment K, slotted rod L, and mold-frame M, adapted to slide on the stationary table or bed D, the eccentrics G, R$^4$, and S, and connecting-rods R R', the upright rods R$^2$, and plunger T, having the arms T' T', eccentric S, and pulleys $t$ $t$, whereby the lower compressors are raised, pivoted levers V, having pulleys $y$ $y$, and lifting devices $b'$ $b''$, all substantially as shown and described.

8. In a brick-machine, the frame A, stationary bed or table D, driving-wheel E, intermeshing with the toothed wheel F, supported upon a shaft carrying a pulley, H, and connected by a belt to a pulley, I, the segment K, the rod L, secured at one end to a mold-frame, M, the eccentrics G, R$^4$, and S, connected by rods R R', in combination with the upright rods R$^2$ and plungers having upwardly and downwardly extending arms, the toggle-joint $u$, pivoted rocking lever V, having rollers $y$ $y$, and adapted to alternately raise the lifters $b$ $b$, all substantially as shown, and for the purposes described.

WILLIAM H. STEWART.

Witnesses:
JAS. I. JOHNSTON,
E. L. SMITH.